US011113569B2

(12) United States Patent
Tanaka (10) Patent No.: US 11,113,569 B2
(45) Date of Patent: Sep. 7, 2021

(54) INFORMATION PROCESSING DEVICE, INFORMATION PROCESSING METHOD, AND COMPUTER PROGRAM PRODUCT

(71) Applicants: Kabushiki Kaisha Toshiba, Minato-ku (JP); Toshiba Digital Solutions Corporation, Kawasaki (JP)

(72) Inventor: Ryohei Tanaka, Kawasaki (JP)

(73) Assignees: Kabushiki Kaisha Toshiba, Minato-ku (JP); Toshiba Digital Solutions Corporation, Kawasaki (JP)

(*) Notice: Subject to any disclaimer, the term of this patent is extended or adjusted under 35 U.S.C. 154(b) by 114 days.

(21) Appl. No.: 16/533,853

(22) Filed: Aug. 7, 2019

(65) Prior Publication Data
US 2020/0065621 A1 Feb. 27, 2020

(30) Foreign Application Priority Data

Aug. 24, 2018 (JP) .............................. JP2018-157462

(51) Int. Cl.
*G06K 9/62* (2006.01)
(52) U.S. Cl.
CPC ......... *G06K 9/6256* (2013.01); *G06K 9/6227* (2013.01); *G06K 9/6264* (2013.01)
(58) Field of Classification Search
CPC .. G06K 9/6256; G06K 9/6227; G06K 9/6264; G06K 9/6262; G06K 9/6259; G06K 2209/01
See application file for complete search history.

(56) References Cited

U.S. PATENT DOCUMENTS

| 8,059,896 | B2 * | 11/2011 | Ito .............................. G06K 9/38 382/177 |
| 2007/0098254 | A1 | 5/2007 | Yang et al. |
| 2016/0012351 | A1 | 1/2016 | Sato |
| 2018/0260737 | A1 | 9/2018 | Tanaka |
| 2018/0285771 | A1 * | 10/2018 | Lee ......................... G06N 20/00 |
| 2019/0164014 | A1 | 5/2019 | Tanaka |

FOREIGN PATENT DOCUMENTS

| JP | 4429370 B2 | 3/2010 |
| JP | 2018-147449 A | 9/2018 |
| JP | 6514305 B1 | 5/2019 |
| WO | WO 2014/136316 A1 | 9/2014 |

OTHER PUBLICATIONS

Breast cancer survivability prediction using labeled, unlabeled, and pseudo-labeled patient data, Juhyeon Kim, Mar. 6, 2013 (Year: 2013).*
Miyato, T., et al., "Distributional Smoothing With Virtual Adversarial Training", arXiv:1507.00677, 2016, pp. 1-12.

* cited by examiner

*Primary Examiner* — Edward F Urban
*Assistant Examiner* — Wassim Mahrouka
(74) *Attorney, Agent, or Firm* — Oblon, McClelland, Maier & Neustadt, L.L.P.

(57) ABSTRACT

An information processing device according to an embodiment includes a determination unit and a first training unit. The determination unit determines whether an unlabeled data point whose class label is unknown is a non-targeted data point that is not targeted for pattern recognition. The first training unit trains a first classifier for use in the pattern recognition through semi-supervised learning using a first training dataset including unlabeled data determined not to be the non-targeted data and not including unlabeled data determined to be the non-targeted data.

9 Claims, 10 Drawing Sheets

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-157462, filed on Aug. 24, 2018; the entire contents of which are incorporated herein by reference.

FIELD

Embodiments described herein relate to an information processing device, an information processing method, and a computer program product.

BACKGROUND

Methods of training classifiers for use in pattern recognition such as facial recognition or character recognition through semi-supervised learning have been known. Semi-supervised learning is a technique of efficiently train, for example, a classifier by using labeled and unlabeled data as training data. The labeled data are data to which class labels are assigned, and the unlabeled data are data whose class labels are unknown.

For semi-supervised learning, inclusion of data not targeted for pattern recognition in the training data is not assumed. Such data are hereinafter referred to as "non-targeted data". However, for example, in a character recognition system configured to cut out portion images (individual character images) corresponding to individual characters from an input image and perform pattern recognition on the cut-out portion images by using a classifier to classify the portion images into character classes of the individual characters, when such a character recognition system accumulates cut-out portion images as unlabeled data, the character recognition system may accumulate portion images not corresponding to any of the character classes (an example of non-targeted data) as unlabeled data due to cutting error. If such accumulated, unlabeled data are used as training data, the classifier is so trained as to classify even the portion images of non-characters into character classes, leading to lowering in recognition accuracy.

As methods for suppressing such inconvenience, a method of eliminating unlabeled data having a low confidence at the classification performed by an existing classifier, from training data is available. However, some non-targeted data, because of having a feature similar to any of the classes, may have high confidences. Alternatively, some data that are not non-targeted data but are viewed differently may have low confidences. As such, by the method of eliminating unlabeled data having low confidences from training data, non-targeted data cannot be accurately separated, for which improvements are needed.

DETAILED DESCRIPTION

An information processing device according to embodiments of the present disclosure includes a determination unit and a first training unit. The determination unit determines whether an unlabeled data point whose class label is unknown is a non-targeted data point that is not targeted for pattern recognition. The first training unit trains a first classifier for use in the pattern recognition through semi-supervised learning using a first training dataset including unlabeled data determined not to be the non-targeted data and not including unlabeled data determined to be the non-targeted data.

The following describes an information processing device, an information processing method, and a computer program product according to the embodiments of the present disclosure in detail with reference to the accompanying drawings.

General Description of Embodiments

The embodiments described herein relate to a technique of preventing inappropriate training of a classifier for use in pattern recognition when the classifier is trained through semi-supervised learning. The inappropriate training occurs due to inclusion of non-targeted data in a training dataset. The prevention of inappropriate training leads to an efficient training for a highly accurate classifier.

Semi-supervised learning is a method of training, for example, a classifier by using a training dataset in which a small amount of labeled data are added to a large amount of unlabeled data. Labeled data are data to which class labels are assigned through, for example, manual teaching operations, and unlabeled data are data whose class labels are unknown. Class labels are labels indicating classes into which the classifier classifies data.

Examples of semi-supervised learning include bootstrapping, graph-based semi-supervised learning, and virtual adversarial training disclosed in the following document.

(Reference Document) T. Miyato, et al. "Distributional Smoothing with Virtual Adversarial Training" arXiv preprint arXiv: 1507. 00677. 2016.

Bootstrapping is a method of classifying unlabeled data by using a classifier trained only from labeled data and retraining the classifier by using the results of classification (recognition) as class labels of unlabeled data. Examples of bootstrapping include self-training using a single classifier and co-training using a plurality of classifiers. Graph-based semi-supervised learning is a method of propagating a class label of labeled data to neighboring unlabeled data based on closeness of data in data distribution. Examples of graph-based semi-supervised learning include semi-supervised k-nearest neighbor graph using a k-nearest neighbor algorithm for calculating closeness of data and semi-supervised Gaussian mixture models using Gaussian mixture.

In the embodiments below, the method of semi-supervised learning for training a classifier is not limited to the examples above and any known method may be used.

The information processing device according to the embodiments is configured to cut out portion data from input data input by a user and perform pattern recognition on the portion data by using a classifier. The information processing device according to the embodiments is configured to store portion data cut out from the input data, or in other words, portion data to be subjected to pattern recognition, as unlabeled data. In this configuration, some portion data may be cut out incorrectly, and consequently, the unlabeled data may include data not belonging to any of the classes of the classifier. In other words, the unlabeled data may include non-targeted data that is not targeted for pattern recognition. If such accumulated unlabeled data are used as training data for the classifier in semi-supervised learning, the classifier is trained to classify the non-targeted data into any of the classes, which leads to lowering in recognition accuracy.

To address this problem, the information processing device according to the embodiments includes another classifier different from the classifier for use in pattern recognition to determine whether the stored unlabeled data are non-targeted data. The information processing device trains the classifier for use in pattern recognition through semi-supervised learning by using a training dataset including unlabeled data determined not to be the non-targeted data, that is, unlabeled data to be classified by the classifier for use in pattern recognition into any of the classes, and not including unlabeled data determined to be the non-targeted data. If unlabeled data includes non-targeted data, this configuration allows the information processing device to accurately eliminate the non-targeted data from the unlabeled data and to properly train the classifier through semi-supervised learning.

The following describes specific examples of an information processing device according to the embodiments configured to perform character recognition as an example of pattern recognition. In the character recognition, input data input by a user is an image (input image) including, for example, a character string, and the portion data cut out from the input data are portion images supposed to be individual character images corresponding to individual characters. The classifier for use in pattern recognition is a character classifier configured to perform multiclass classification classifying individual character images into certain character classes. The non-targeted data are non-character data not to be classified into any of the character classes.

The information processing device according to the embodiments is not limited to the device performing character recognition. The embodiments of the present disclosure are effectively applicable to an information processing device performing other pattern recognition schemes such as facial recognition for recognizing human faces in an image, object recognition for recognizing objects in an image, and activity recognition for recognizing human activities based on sensor data indicating human movements. In the description below, components having similar functions are similarly numbered and the same explanations are eliminated as appropriate.

First Embodiment

Figure 1:
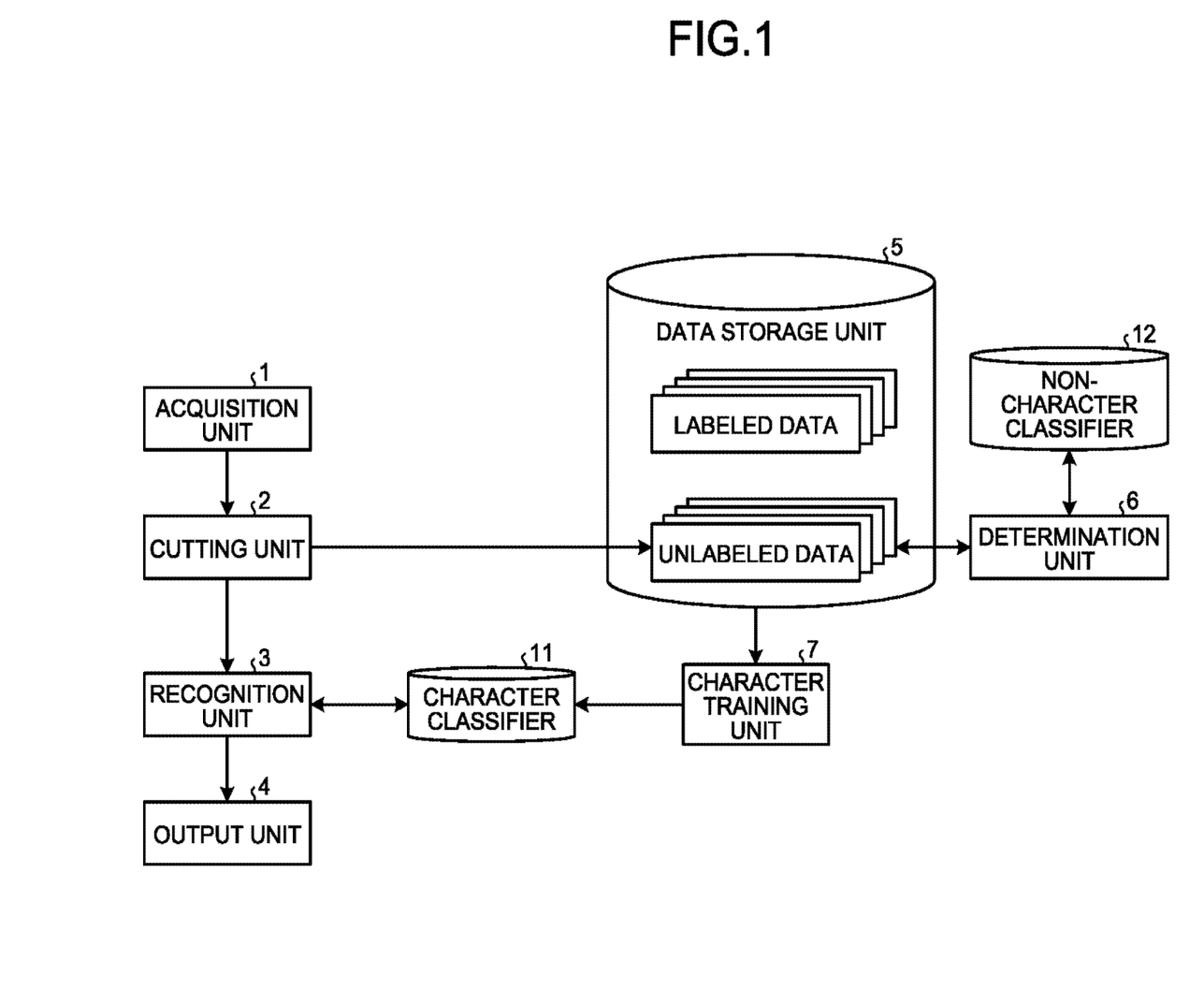
FIG. 1 is a block diagram illustrating example functional configurations of an information processing device according to a first embodiment.

FIG. 1 is a block diagram illustrating example functional configurations of an information processing device according to a first embodiment of the present disclosure. As illustrated in FIG. 1, the information processing device according to the first embodiment includes an acquisition unit 1, a cutting unit 2, a recognition unit 3, an output unit 4, a data storage unit 5, a determination unit 6, and a character training unit (first training unit) 7.

The acquisition unit 1 acquires an input image input by a user. The acquisition unit 1 may be configured to directly acquire an input image input by a user, or may be configured to acquire an input image input by a user and stored in a certain storage in the information processing device or in an external to the information processing device. The input image includes a character string that is a series of characters. The input image acquired by the acquisition unit 1 is handed over to the cutting unit 2.

The cutting unit 2 cuts out a region (portion image) assumed to be an individual character from the input image received from the acquisition unit 1. To cut out the portion image, the cutting unit 2, for example, obtains a luminance histogram of the input image in the horizontal direction and estimates the positions at which the individual characters of a character string included in the input image are divided on the basis of the luminance histogram. The method of cutting out the portion image from the input image is not limited to this and various other known methods can be used. The first embodiment assumes that the cutting unit 2 possibly erroneously estimates the positions in cutting the portion images and cuts out a portion image not corresponding to any individual character. The portion image cut out from the input image by the cutting unit 2 is passed on to the recognition unit 3 and stored in the data storage unit 5 as unlabeled data.

The recognition unit 3 performs character recognition on the portion image received from the cutting unit 2 by using a character classifier 11. The recognition unit 3, for example, inputs the amounts of feature extracted from the portion image into the character classifier 11 and recognizes which character class the portion image belongs to. The result of the character recognition by the recognition unit 3 is passed on to the output unit 4.

The output unit 4 outputs the recognition result of the recognition unit 3. The recognition result of the recognition unit 3 is, for example, a class label of a character class output by the character classifier 11. The output unit 4 outputs the recognition result by, for example, displaying the class label on a display device.

The data storage unit 5 stores therein labeled data for use in training the character classifier 11 and stores therein portion images cut out from the input image by the cutting unit 2 as unlabeled data.

The determination unit 6 determines whether the unlabeled data stored in the data storage unit 5 is non-character data by using a non-character classifier 12. The non-character classifier 12 is configured to classify the unlabeled data into a non-character class or a character class using binary classification. The determination unit 6 determines whether the unlabeled data are non-character data by, for example, inputting the amounts of feature extracted from the unlabeled data into the non-character classifier 12.

The character training unit 7 trains the character classifier 11, which is used by the recognition unit 3 for character recognition, through semi-supervised learning using a character training dataset (first training dataset) including unlabeled data that is, stored in the data storage unit 5 and is determined not to be the non-character data by the determination unit 6 and including labeled data stored in the data storage unit 5. The training algorithm corresponds to the classification algorithm of the character classifier 11. The character training unit 7 can use algorithms such as logistic regression, support vector machine, neural network, and subspace methods.

With respect to semi-supervised learning schemes, various schemes described above are applicable. When semi-supervised learning is performed by bootstrapping, the character training unit 7 may eliminate some unlabeled data from the character training dataset based on the confidence of a prediction result output from a classifier trained only from labeled data.

Training the character classifier 11 means updating the existing character classifier 11 with a newly generated classifier by training except when the character classifier 11 is initially generated. The existing character classifier 11 may be updated with a trained and newly generated classifier, by evaluating the classification accuracy of the trained and newly generated classifier and when the evaluation value of the new classifier is higher than the evaluation value of the existing character classifier 11, by using a validation dataset consisting of labeled data. After the character classifier 11 is updated by training, the recognition unit 3 performs character recognition by using the updated character classifier 11.

Figure 2:
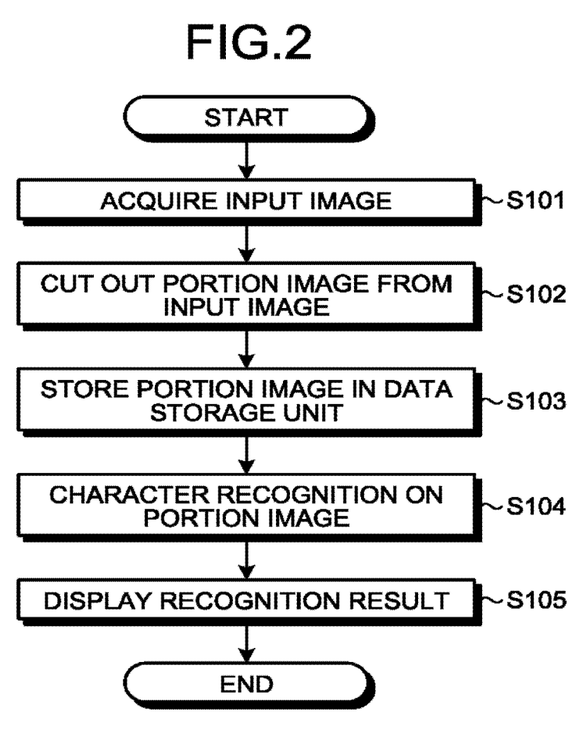
FIG. 2 is a flowchart illustrating the procedure of character recognition processing.
Figure 3:
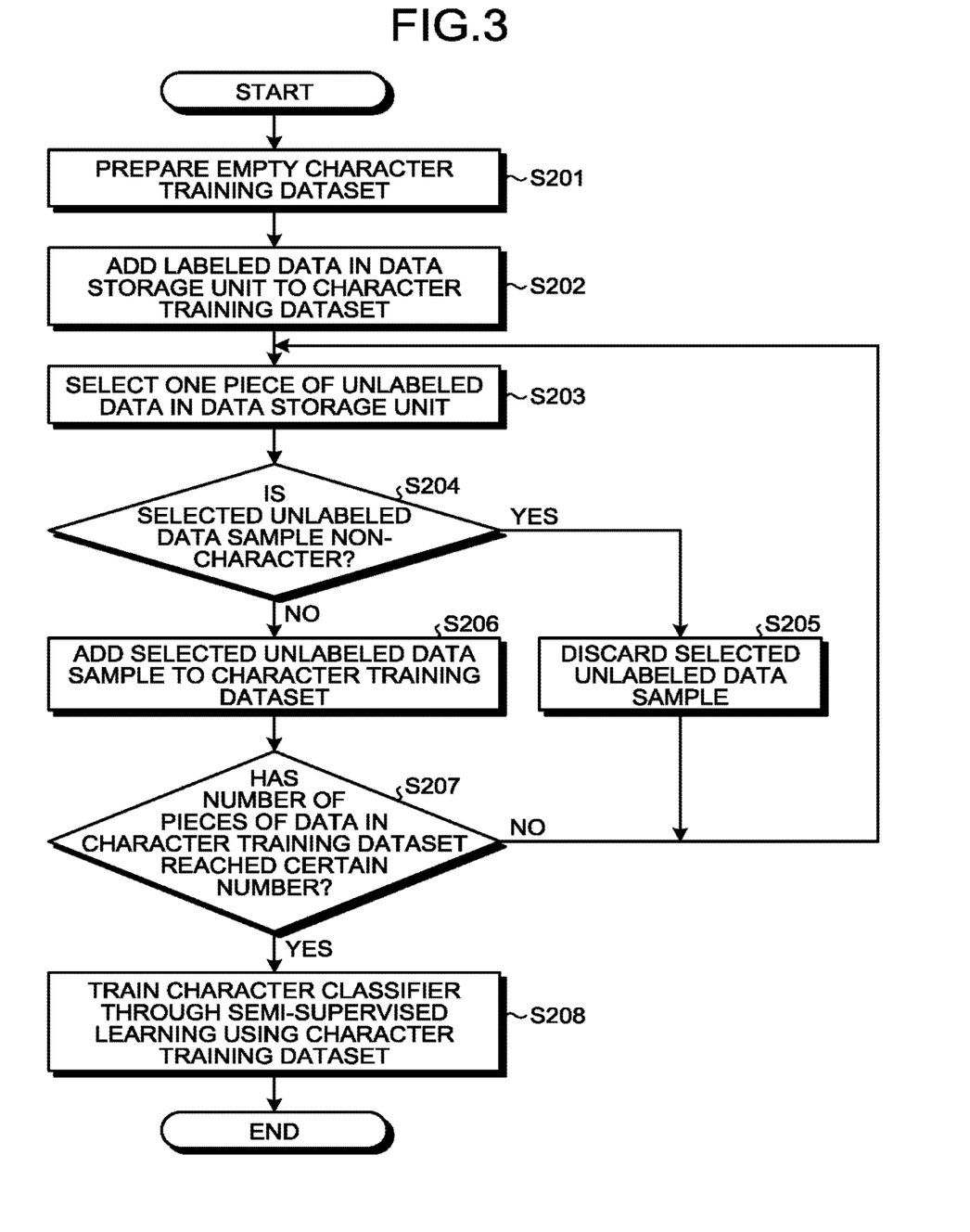
FIG. 3 is a flowchart illustrating the procedure of training a character classifier.

The operations of the information processing device according to the first embodiment will be described with reference to FIGS. 2 and 3. FIG. 2 is a flowchart illustrating a character recognition procedure of the information processing device. FIG. 3 is a flowchart illustrating the training procedure on the character classifier 11 of the information processing device.

The character recognition processing of the information processing device will be described with reference to FIG. 2. When a user inputs an input image, the acquisition unit 1 acquires the input image (Step S101). The cutting unit 2 cuts out a portion image from the input image acquired at Step S101 (Step S102). The cutting unit 2 stores the portion image cut out at Step S102 in the data storage unit 5 as unlabeled data (Step S103). The portion image is passed on to the recognition unit 3.

The recognition unit 3 performs character recognition on the portion image cut out at Step S102 by using the character classifier 11 (Step S104). The output unit 4 displays the recognition result of the character recognition at Step S104 on, for example, a display device (Step S105).

The information processing device according to the first embodiment repeats the character recognition processing described above and unlabeled data are accumulated in the data storage unit 5.

The training processing on the character classifier 11 of the information processing device will be described with reference to FIG. 3. The character classifier 11 is trained, for example, periodically at predetermined intervals, or when certain conditions are satisfied such as when the processing load of the information processing device is equal to or lower than a certain level or when the amount of data stored in the data storage unit 5 reaches a certain amount.

When it gets the timing to train the character classifier 11, the character training unit 7 prepares an empty character training dataset (Step S201). The character training unit 7 adds labeled data in the data storage unit 5 to the character training dataset (Step S202).

The character training unit 7 selects a piece of unlabeled data stored in the data storage unit 5 (Step S203), and passes on the selected unlabeled data sample to the determination unit 6 and requests the determination unit 6 to perform determination processing. The determination unit 6 determines whether the unlabeled data sample received from the character training unit 7 is non-character by using the non-character classifier 12 (Step S204).

If the determination unit 6 determines that the unlabeled data sample is non-character (Yes at Step S204), the character training unit 7 discards this unlabeled data sample (Step S205) and the process returns to Step S203 and the subsequent processes are repeated. If the determination unit 6 determines that the unlabeled data sample is not non-character (No at Step S204), the character training unit 7 adds this unlabeled data sample to the character training dataset (Step S206).

The character training unit 7 checks whether the number of pieces of data in the character training dataset reaches a certain number (Step S207). If the number of pieces of data in the character training dataset has not reached the certain number (No at Step S207), the process returns to Step S203 and the subsequent processes are repeated. If the number of pieces of data in the character training dataset reaches the certain number (Yes at Step S207), the character training unit 7 trains the character classifier 11, which is used for character recognition by the recognition unit 3, through semi-supervised learning using the character training dataset generated as described above (Step S208).

As described with reference to the specific example above, the information processing device according to the first embodiment determines whether the unlabeled data stored in the data storage unit 5 is non-character data (non-targeted data) that is not targeted for character recognition. The information processing device is configured to train the character classifier 11 (first classifier) for use in character recognition through semi-supervised learning using the character training dataset (first training dataset) including unlabeled data determined not to be the non-character data and labeled data. If the unlabeled data stored in the data storage unit 5 includes non-character data, this configuration allows the information processing device according to the first embodiment to accurately eliminate the non-character data from the unlabeled data and properly train the character classifier 11 through semi-supervised learning.

Second Embodiment

Described next is a second embodiment of the present disclosure. An information processing device according to the second embodiment further includes a function of training the non-character classifier 12 compared to the information processing device according to the first embodiment. The following only describes the differences between the first embodiment and the second embodiment.

Figure 4:
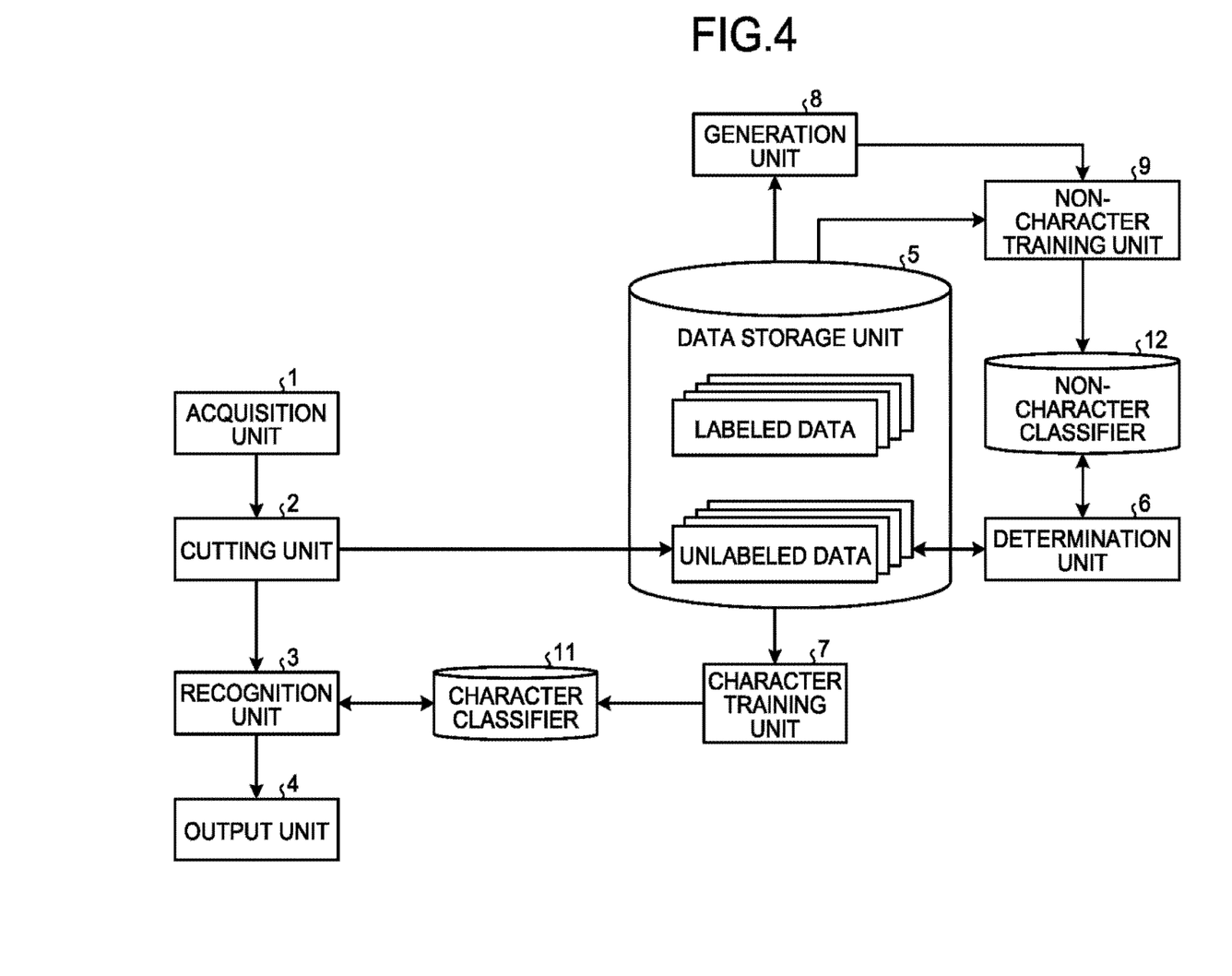
FIG. 4 is a block diagram illustrating example functional configurations of an information processing device according to a second embodiment.

FIG. 4 is a block diagram illustrating example functional configurations of the information processing device according to the second embodiment. The information processing device according to the second embodiment differs from the first embodiment illustrated in FIG. 1 in that it further includes a generation unit 8 and a non-character training unit 9 (second training unit).

The generation unit 8 generates pseudo-non-character data (pseudo-non-targeted data) by using the data stored in the data storage unit 5. The pseudo-non-character data are quasi non-character data generated artificially. A non-character label is assigned to the pseudo-non-character data to be used as training data for the non-character classifier 12. This means that the pseudo-non-character data are used as labeled data.

In the second embodiment, since portion images corresponding to regions of individual characters in a character string are cut out from an input image and stored as unlabeled data, the individual characters may be excessively divided or adjacent two individual characters may be incorrectly cut out as one character. The non-character data included, if any, in the stored unlabeled data are created in such a manner in many cases. To solve this problem, the generation unit 8 generates pseudo-non-character data. The pseudo-non-character data are generated such that, for example, the generation unit 8 randomly selects a piece of data from the unlabeled data or the labeled data in the data storage unit 5 and vertically divides the selected data, or the generation unit 8 randomly selects two pieces of data and arranges them horizontally, and cuts out an arbitrary portion of the horizontally arranged data. The generation unit 8 assigns non-character labels to the resulting data and the pseudo-non-character data are generated. The generation unit 8 can generate pseudo-non-character data that is similar to the non-character data included in the unlabeled data. Such pseudo-non-character data can be used as training data for the non-character classifier 12 and this configuration can train the non-character classifier 12 to accurately separate the non-character data.

The non-character training unit 9 trains the non-character classifier 12 that performs binary classification on the unlabeled data into a non-character class or a character class, through semi-supervised learning using non-character training dataset (second training dataset). The non-character training dataset includes the pseudo-non-character data generated by the generation unit 8 and at least some of the labeled data in the data storage unit 5. The labeled data may include non-character data to which the non-character label is assigned. The training algorithm corresponds to the classification algorithm of the non-character classifier 12. The non-character training unit 9 can use algorithms such as logistic regression, support vector machine, neural network, and subspace methods.

In the second embodiment, the non-character training unit 9 trains the non-character classifier 12 before the character training unit 7 trains the character classifier 11. The determination unit 6 uses the trained non-character classifier 12 to determine whether the unlabeled data in the data storage unit 5 is non-character data. The character classifier 11 is then trained through semi-supervised learning using character training dataset including the unlabeled data determined not to be the non-character data and labeled data.

Figure 5:
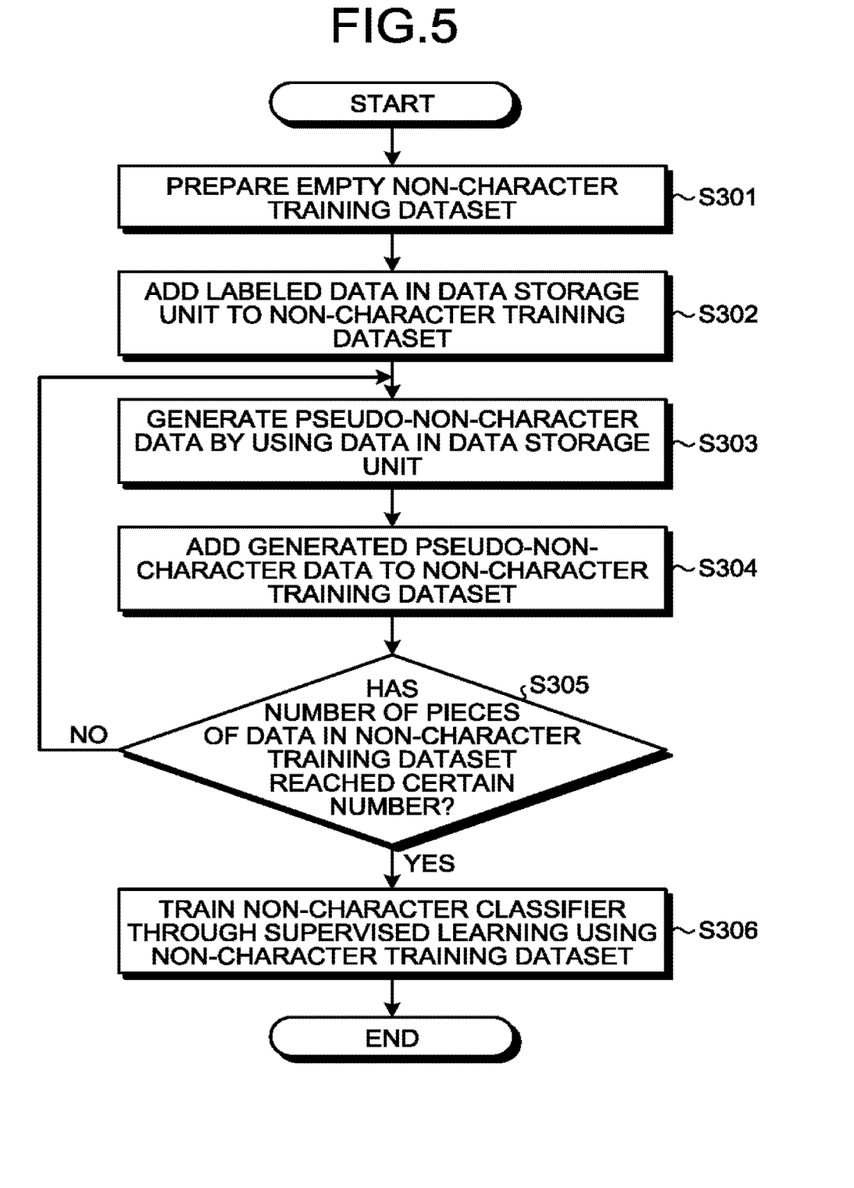
FIG. 5 is a flowchart illustrating the procedure of training a non-character classifier.

FIG. 5 is a flowchart illustrating the training procedure on the non-character classifier 12 of the information processing device according to the second embodiment. The non-character classifier 12 is trained before the character classifier 11 is trained. The timing at which the non-character classifier 12 is trained is the same as the timing of training the character classifier 11 described above.

When it gets the timing to train the non-character classifier 12, the non-character training unit 9 prepares an empty non-character training dataset (Step S301). The non-character training unit 9 adds labeled data in the data storage unit 5 to the non-character training dataset (Step S302).

The non-character training unit 9 instructs the generation unit 8 to generate pseudo-non-character data. Upon receiving the instruction from the non-character training unit 9, the generation unit 8 generates pseudo-non-character data by using data in the data storage unit 5 and passes on the pseudo-non-character data to the non-character training unit 9 (Step S303). The non-character training unit 9 adds the pseudo-non-character data received from the generation unit 8 to the non-character training dataset (Step S304).

The non-character training unit 9 checks whether the number of pieces of data in the non-character training dataset reaches a certain number (Step S305). If the number of pieces of data in the non-character training dataset has not reached the certain number (No at Step S305), the process returns to Step S303 and the subsequent processes are repeated. If the number of pieces of data in the non-character training dataset reaches the certain number (Yes at Step S305), the non-character training unit 9 trains the non-character classifier 12, which performs binary classification classifying unlabeled data into non-character classes or character classes, through supervised learning using the non-character training dataset generated as described above (Step S306).

After the non-character classifier 12 is trained, the character training unit 7 trains the character classifier 11 in the same manner as that in the first embodiment. The character classifier 11 is trained in the same manner as illustrated in FIG. 3 and thus the training processes of the character classifier 11 are not described herein.

As described above, the information processing device according to the second embodiment generates pseudo-non-character data by using data in the data storage unit 5 and trains the non-character classifier 12, which performs binary classification classifying the unlabeled data into non-character classes or character classes, through supervised learning using non-character training dataset including the pseudo-non-character data and labeled data. The information processing device according to the second embodiment can train the non-character classifier 12 properly and increase accuracy in eliminating non-character data from the unlabeled data stored in the data storage unit 5.

In the description above, the information processing device is configured to train (generate) the non-character classifier 12 that performs binary classification classifying the unlabeled data into non-character classes or character classes. However, the information processing device may train (generate) a non-character classifier 12 that performs multiclass classification classifying the unlabeled data into a non-character class or any of the character classes into which the character classifier 11 is configured to classify the unlabeled data. In this case, the non-character class may be divided into a plurality of subclasses so that the non-characters can be classified into more specific categories based on their form. Using the non-character classifier 12 configured to perform multiclass classification on the unlabeled data can further increase separation accuracy of non-character data compared to the case of using the non-character classifier 12 configured to perform binary classification.

Third Embodiment

Described next is a third embodiment of the present disclosure. An information processing device according to the third embodiment has a function of training the non-character classifier 12 in the same manner as the second embodiment but differs from the second embodiment in that the non-character classifier 12 is trained through semi-supervised learning. The following only describes the differences between the third embodiment and the first and second embodiments.

Figure 6:
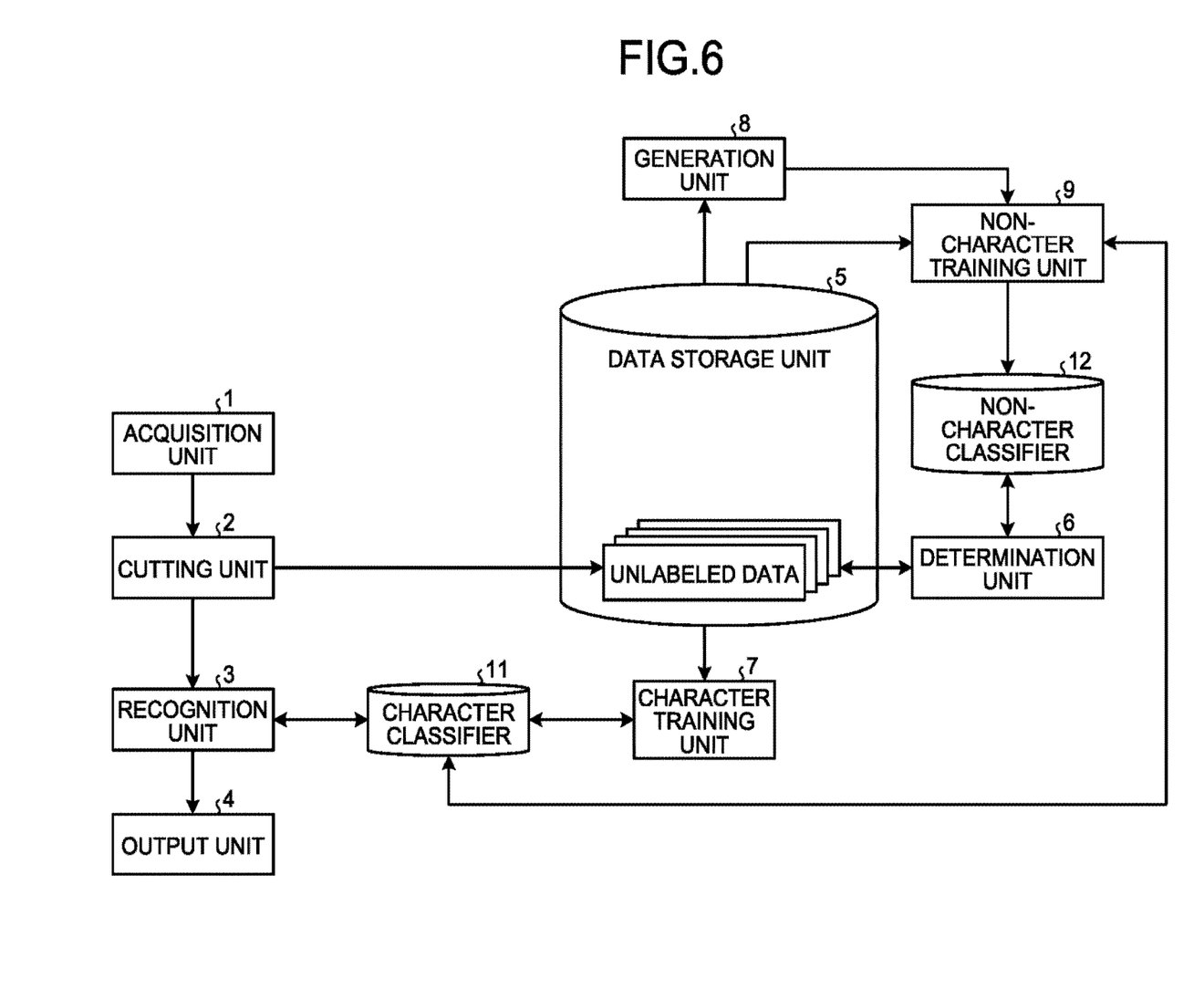
FIG. 6 is a block diagram illustrating example functional configurations of an information processing device according to a third embodiment.

FIG. 6 is a block diagram illustrating example functional configurations of the information processing device according to the third embodiment. The configuration of the information processing device according to the third embodiment is the same as the second embodiment illustrated in FIG. 4 except that the data storage unit 5 stores therein no labeled data and the information processing device according to the third embodiment trains the non-character classifier 12 through semi-supervised learning using the unlabeled data stored in the data storage unit 5. To implement this configuration, the non-character training unit 9 uses the existing character classifier 11. The existing character classifier 11 has already been trained (generated) through, for example, supervised learning using labeled data.

Training the non-character classifier 12 through semi-supervised learning can be implemented by, for example, using non-character training dataset including the pseudo-non-character data (labeled data tagged with the non-character label) generated by the generation unit 8 and unlabeled data, out of the unlabeled data in the data storage unit 5, having a confidence equal to or higher than a certain threshold obtained by the existing character classifier 11 in the classification process.

Figure 7:
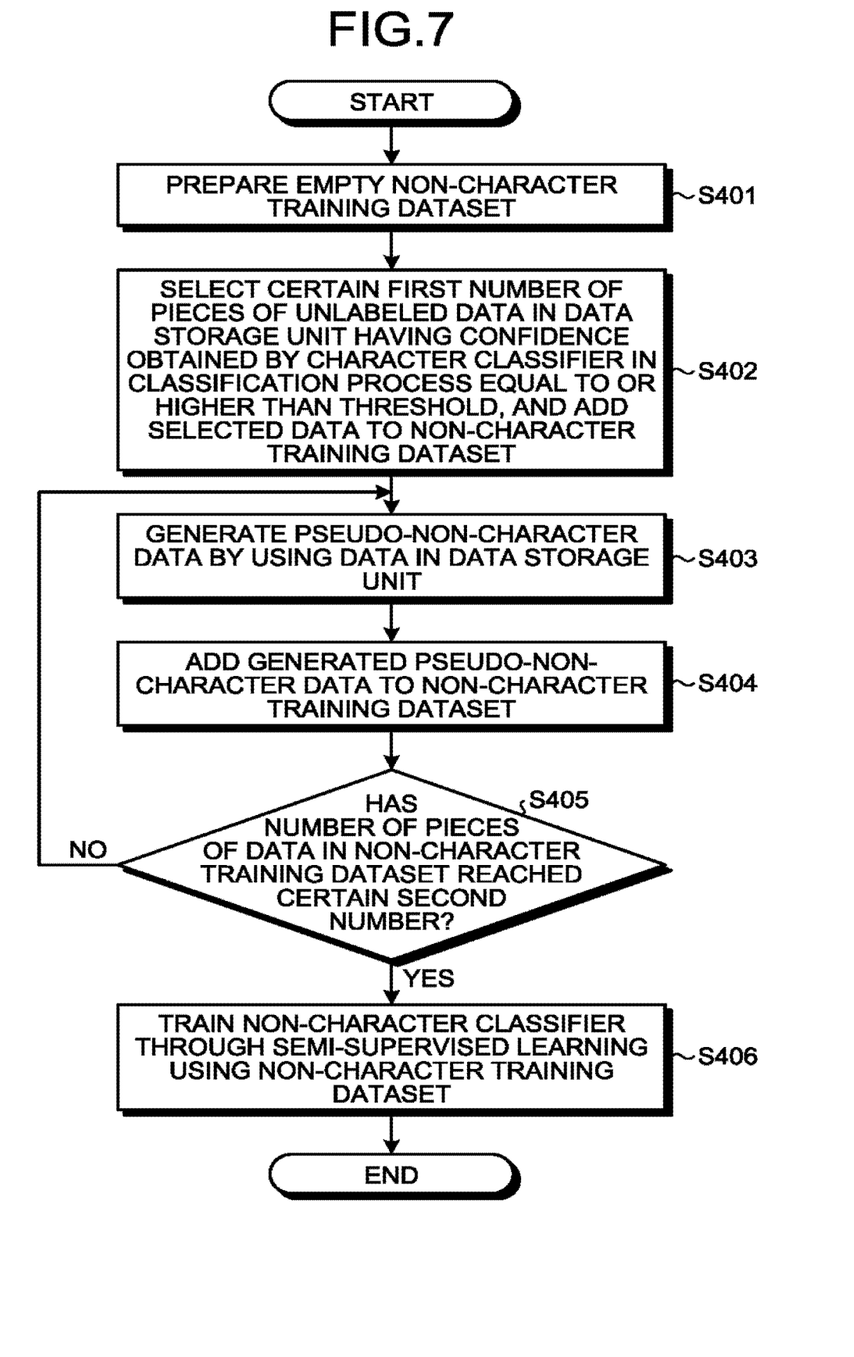
FIG. 7 is a flowchart illustrating the procedure of training a non-character classifier.

FIG. 7 is a flowchart illustrating the training procedure on the non-character classifier 12 of the information processing device according to the third embodiment.

When it gets the timing to train the non-character classifier 12, the non-character training unit 9 prepares an empty non-character training dataset (Step S401). The non-character training unit 9 obtains confidence of unlabeled data in the data storage unit 5 that has been obtained in the classification process of the character classifier 11, selects a certain first number of pieces of unlabeled data having the confidence equal to or higher than a threshold, and adds the data to the non-character training dataset (Step S402).

The non-character training unit 9 instructs the generation unit 8 to generate pseudo-non-character data. Upon receiving the instruction from the non-character training unit 9, the generation unit 8 generates the pseudo-non-character data by using data in the data storage unit 5 in the same manner as in the second embodiment above and passes on the pseudo-non-character data to the non-character training unit 9 (Step S403). The non-character training unit 9 adds the pseudo-non-character data received from the generation unit 8 to the non-character training dataset (Step S404).

The non-character training unit 9 checks whether the number of pieces of data in the non-character training dataset reaches a certain second number (Step S405). If the number of pieces of data in the non-character training dataset has not reached the certain second number (No at Step S405), the process returns to Step S403 and the subsequent processes are repeated. If the number of pieces of data in the non-character training dataset reaches the certain second number (Yes at Step S405), the non-character training unit 9 trains the non-character classifier 12 through semi-supervised learning using the non-character training dataset generated as described above (Step S406).

When the training of the non-character classifier 12 ends, the character training unit 7 trains the character classifier 11 in the same manner as in the first embodiment above. In the third embodiment, since the data storage unit 5 stores therein no labeled data, the character training unit 7 trains the character classifier 11 through semi-supervised learning using the first training dataset not including any labeled data and using the existing character classifier 11. The existing character classifier 11 is a trained classifier that has been trained through supervised learning using labeled data as described above. In the third embodiment, for example, unlabeled data included in the first training dataset are classified by using the existing character classifier 11 and the existing character classifier 11 is trained by using the result of classification as the class label of the unlabeled data.

As described above, the information processing device according to the third embodiment generates pseudo-non-character data by using data in the data storage unit 5 and trains the non-character classifier 12 through semi-supervised learning using non-character training dataset including the pseudo-non-character data and unlabeled data having confidence in character class equal to or higher than a threshold. If, for example, labeled data tagged with character classes are not available enough, this configuration allows the information processing device according to the third embodiment to train the non-character classifier 12 properly and efficiently and to increase accuracy in eliminating non-character data from the unlabeled data stored in the data storage unit 5. Since the information processing device trains the character classifier 11 and the non-character classifier 12 without using labeled data, the memory capacity needed for training can be reduced.

To train the non-character classifier 12 through semi-supervised learning when the data storage unit 5 stores therein no labeled data, the information processing device described above uses the non-character training dataset including pseudo-non-character data generated by the generation unit 8 and unlabeled data having confidence obtained in the classification process of the character classifier 11 equal to or higher than a certain threshold. If the data storage unit 5 stores therein labeled data, the information processing device may train the non-character classifier 12 through semi-supervised learning by using non-character training dataset including, in addition to the pseudo-non-character data and the unlabeled data, at least some pieces of the labeled data stored in the data storage unit 5.

Fourth Embodiment

Described next is a fourth embodiment of the present disclosure. An information processing device according to the fourth embodiment has a function of training the non-character classifier 12 in the same manner as the second and third embodiments but differs from the second and third embodiments in the method of generating the pseudo-non-character data used as training data. That is, although the information processing device according to the second or third embodiment generates the pseudo-non-character data by processing data in the data storage unit 5, the information processing device according to the fourth embodiment generates the pseudo-non-character data by processing the input image acquired by the acquisition unit 1, which is, more specifically, an input image before the cutting unit 2 cuts out portion images from the input image.

Figure 8:
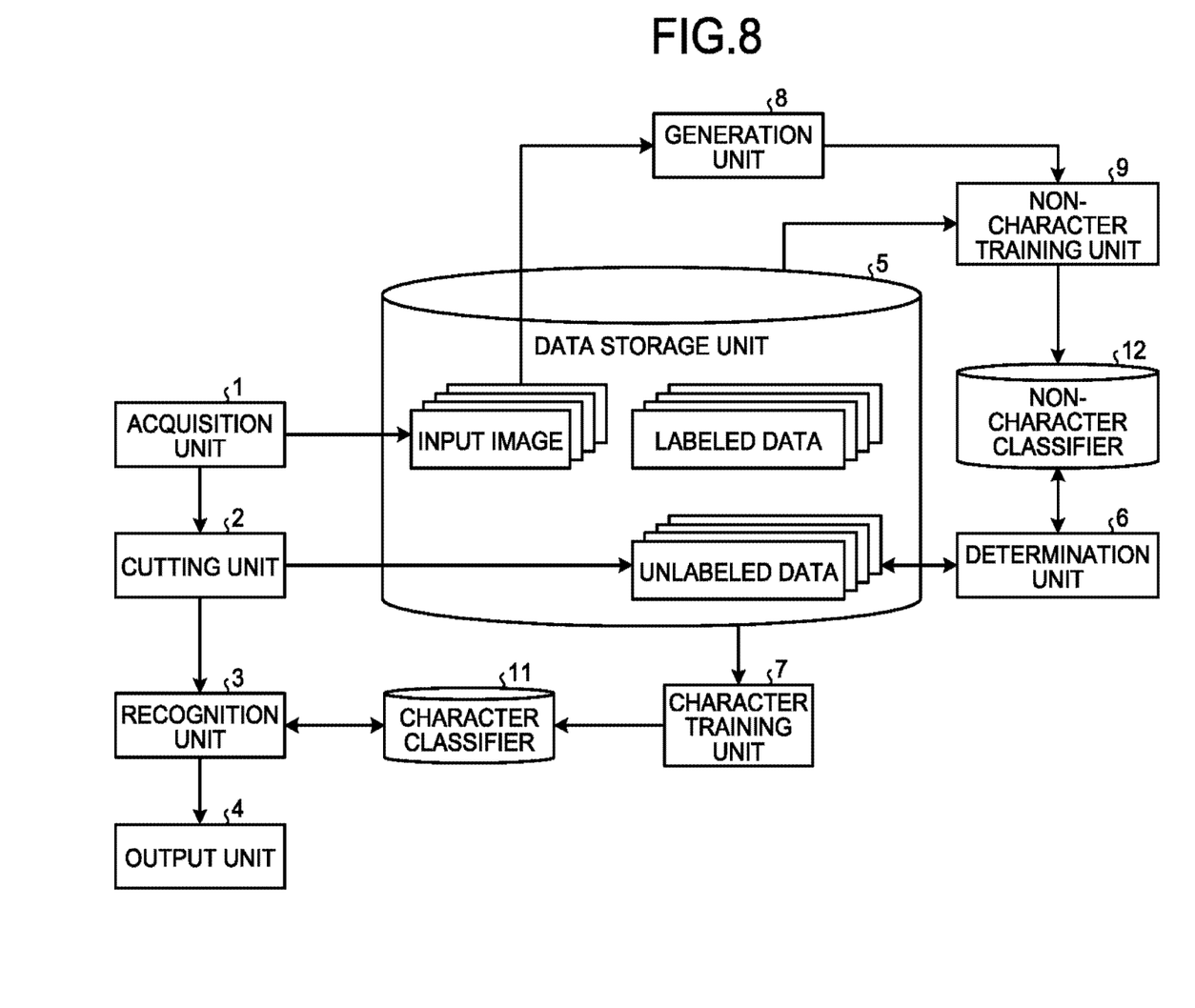
FIG. 8 is a block diagram illustrating example functional configurations of an information processing device according to a fourth embodiment.

FIG. 8 is a block diagram illustrating example functional configurations of the information processing device according to the fourth embodiment. The configuration of the information processing device according to the fourth embodiment is the same as the second embodiment illustrated in FIG. 4 except that the data storage unit 5 stores therein input images (input data) acquired by the acquisition unit 1 in addition to the labeled data and unlabeled data. In other words, in the fourth embodiment, every time the acquisition unit 1 acquires an input image, the acquisition unit 1 passes on the input image to the cutting unit 2 and to the data storage unit 5.

In the fourth embodiment, the generation unit 8 generates pseudo-non-character data by using the input image in the data storage unit 5. To generate pseudo-non-character data, the generation unit 8 processes an input image in the data storage unit 5 such that, for example, portions of the input image are randomly cut out and then the generation unit 8 assigns a non-character label to the resulting data. In this case, the resulting data after the processing on the input image may be classified by the existing non-character classifier 12 and if the data has confidence in non-character equal to or higher than a certain threshold, the generation unit 8 may determine the data to be the pseudo-non-character data. If the confidence in non-character is equal to or higher than the threshold but is excessively higher than the threshold, the data has substantially no use as training data, and the generation unit 8 may eliminate such data from the pseudo-non-character data.

Figure 9:
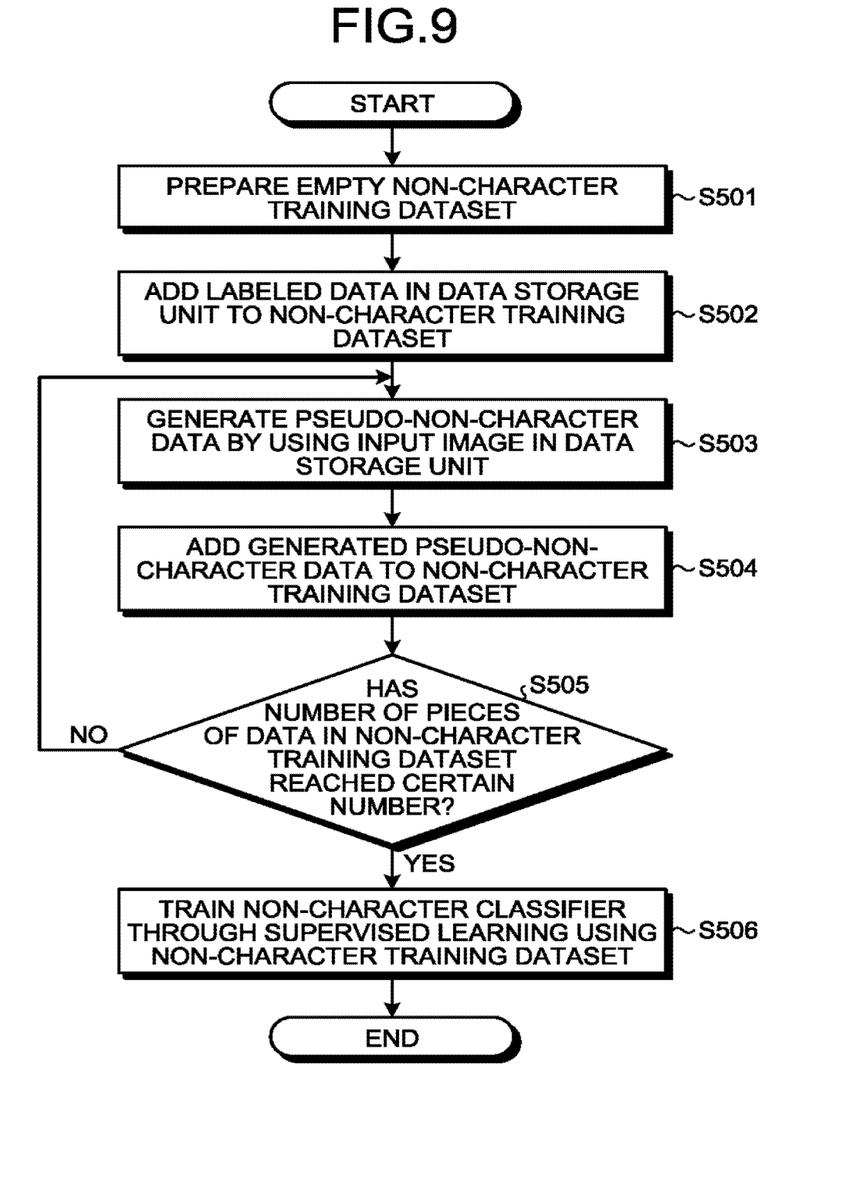
FIG. 9 is a flowchart illustrating the procedure of training a non-character classifier.

FIG. 9 is a flowchart illustrating the training procedure on the non-character classifier 12 of the information processing device according to the fourth embodiment. In FIG. 9, Step S501, Step S502, and Step S504 to Step S506 correspond to Step S301, Step S302, and Step S304 to Step S306 in FIG. 5, respectively. The procedure according to the fourth embodiment differs from the procedure illustrated in FIG. 5 in that, at Step S503, the generation unit 8 generates pseudo-non-character data by using an input image in the data storage unit 5 upon receiving an instruction from the non-character training unit 9.

The flowchart in FIG. 9 illustrates an example training procedure on the non-character classifier 12 through supervised learning in the same manner as in the second embodiment above. However, the non-character classifier 12 may be trained through semi-supervised learning in the same manner as in the third embodiment above. In this case, Step S502, Step S505, and Step S506 in FIG. 9 are replaced with Step S402, Step S405, and Step S406 in FIG. 7, respectively.

As described above, the information processing device according to the fourth embodiment generates pseudo-non-character data by processing an input image acquired by the acquisition unit 1, which is, more specifically, an input image before the cutting unit 2 cuts out portion images from the input image. This configuration facilitates generation of pseudo-non-character data compared to the second and third embodiments in which pseudo-non-character data are generated by using the unlabeled data and labeled data in the data storage unit 5.

Supplemental Description

The information processing device according to the embodiments above can be implemented by, for example, using a general-purpose computer as basic hardware. In other words, the functions of the information processing device above can be implemented by causing one or more processors installed in the general-purpose computer to execute a computer program. The information processing device according to the embodiments above may be implemented by a computer program pre-installed in a computer, or may be implemented by installing a computer program as appropriate stored in a computer-readable storage medium or obtained via a network.

Figure 10:
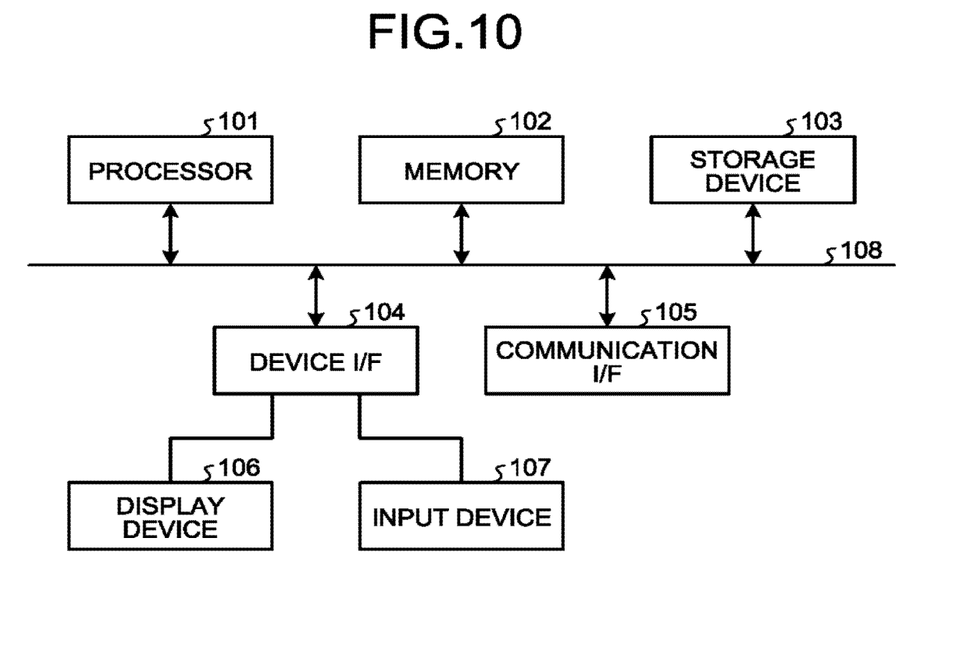
FIG. 10 is a block diagram illustrating an example hardware configuration of an information processing device.

FIG. 10 is a block diagram illustrating an example hardware configuration of the information processing device according to the embodiments above. As illustrated in FIG. 10, for example, the information processing device has a typical computer hardware configuration including a processor 101 such as a central processing unit (CPU), a memory 102 such as a random access memory (RAM) and a read only memory (ROM), a storage device 103 such as a hard disk drive (HDD) and a solid state drive (SSD), a device I/F 104 for connecting a display device 106 such as a liquid crystal panel, an input device 107 such as a keyboard and a pointing device, and other devices, a communication I/F 105 for communicating with devices external to the information processing device, and a bus 108 for connecting these components.

When the information processing device according to the embodiments above is implemented by the hardware configuration illustrated in FIG. 10, functions of the units such as the acquisition unit 1, the cutting unit 2, the recognition unit 3, the output unit 4, the determination unit 6, the character training unit 7, the generation unit 8, and the non-character training unit 9 can be implemented by, for example, the processor 101 using the memory 102 and reading and executing the computer program stored in, for example, the storage device 103. The information processing device according to the embodiments above can implement the function of the data storage unit 5 by using, for example, the storage device 103. The character classifier 11 and the non-character classifier 12 can be stored in, for example, the storage device 103.

Some or all of the functions of the units in the information processing device according to the embodiments above can be implemented by a dedicated hardware (dedicated processor, not a general-purpose processor) such as an application specific integrated circuit (ASIC) or a field-programmable gate array (FPGA). The functions of the units described above may be implemented by using a plurality of processors.

Figure 11:
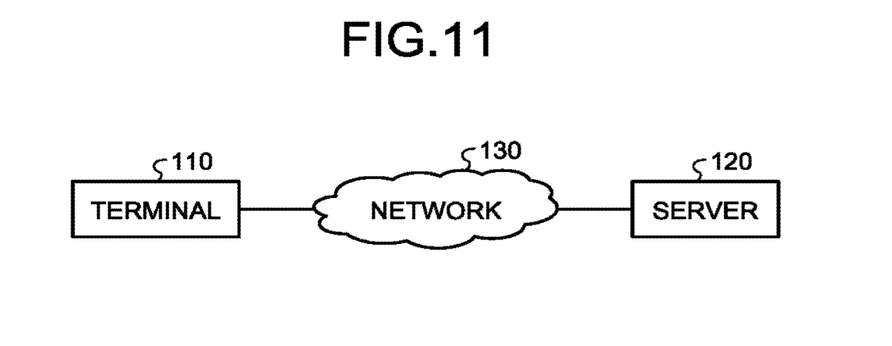
FIG. 11 is a block diagram illustrating an example configuration of an information processing device including a terminal and a server.

The information processing device according to the embodiments above can be implemented by, but not limited to, a single computer. Alternatively, the information processing device can be implemented with its functions being distributed to a plurality of computers. For example, as illustrated in FIG. 11, the information processing device may be configured by a terminal 110 used by a user and a server 120 that are connected via a network 130. In this case, for example, the terminal 110 may include the acquisition unit 1, the cutting unit 2, the recognition unit 3, and the output unit 4, and the server 120 may include the data storage unit 5, the determination unit 6, the character training unit 7, the generation unit 8, and the non-character training unit 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
processing circuitry configured to
determine whether unlabeled data whose class label is unknown is non-targeted data that is not targeted for pattern recognition to be performed by a first classifier, the determination being performed by a second classifier;
train the first classifier through semi-supervised learning using a first training dataset including a piece of the unlabeled data determined not to be the non-targeted data and not including a piece of the unlabeled data determined to be the non-targeted data;
cut apiece of portion data out of a piece of the unlabeled data;

generate a piece of pseudo-non-targeted data by assigning, to the piece of portion data, a non-targeted label indicating the non-targeted data; and train the second classifier by using a second training dataset including the generated pseudo-non-targeted data.

2. The information processing device according to claim 1, wherein the processing circuitry is further configured to train the first classifier through semi-supervised learning using the first training dataset including the unlabeled data determined not to be the non-targeted data and labeled data to which a class label is assigned and not including the unlabeled data determined to be the non-targeted data.

3. The information processing device according to claim 1, wherein the processing circuitry is further configured to train the first classifier through semi-supervised learning using the first training dataset and a pre-trained classifier, the first training dataset including the unlabeled data determined not to be the non-targeted data and not including labeled data to which a class label is assigned and the unlabeled data determined to be the non-targeted data.

4. The information processing device according to claim 1, wherein the processing circuitry is further configured to train the second classifier through supervised learning using the second training dataset including the pseudo-non-targeted data and labeled data to which a class label is assigned.

5. The information processing device according to claim 1, wherein the processing circuitry is further configured to train the second classifier through semi-supervised learning using the second training dataset including the pseudo-non-targeted data and the unlabeled data.

6. The information processing device according to claim 1, wherein the processing circuitry is further configured to train the second classifier through semi-supervised learning using the second training dataset including the pseudo-non-targeted data, labeled data to which a class label is assigned, and the unlabeled data.

7. The information processing device according to claim 1, wherein the processing circuitry is further configured to cut out portion data from input data, the portion data being subjected to the pattern recognition, wherein the unlabeled data are the portion data cut out by the processing circuitry.

8. An information processing method, comprising:

determining whether unlabeled data whose class label is unknown is non-targeted data that is not targeted for pattern recognition to be performed by a first classifier, the determination being performed by a second classifier;

training the first classifier through semi-supervised learning using a training dataset including a piece of the unlabeled data determined not to be the non-targeted data and not including apiece of the unlabeled data determined to be the non-targeted data;

cutting a piece of portion data out of apiece of the unlabeled data;

generating a piece of pseudo-non-targeted data by assigning, to the piece of portion data, a non-targeted label indicating the non-targeted data; and training the second classifier by using a second training dataset including the pseudo-non-targeted data.

9. A computer program product comprising a non-transitory computer-readable recording medium including programmed instructions, wherein the programmed instructions, when executed by a computer, cause the computer to perform a method, comprising:

determining whether unlabeled data whose class label is unknown is non-targeted data that is not targeted for pattern recognition to be performed by a first classifier, the determination being performed by a second classifier;

training the first classifier through semi-supervised learning using a training dataset including a piece of the unlabeled data determined not to be the non-targeted data and not including a piece of the unlabeled data determined to be the non-targeted data;

cutting a piece of portion data out of a piece of the unlabeled data;

generating a piece of pseudo-non-targeted data by assigning, to the piece of portion data, a non-targeted label indicating the non-targeted data; and training the second classifier by using a second training dataset including the generated pseudo-non-targeted data.

* * * * *